(12) United States Patent
In

(10) Patent No.: US 11,330,185 B2
(45) Date of Patent: May 10, 2022

(54) LENS CONTROL APPARATUS, OPTICAL APPARATUS, AND LENS CONTROL METHOD

(71) Applicant: CANON KABUSHIKI KAISHA, Tokyo (JP)

(72) Inventor: Hiromi In, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 17/032,053

(22) Filed: Sep. 25, 2020

(65) Prior Publication Data

US 2021/0120182 A1    Apr. 22, 2021

(30) Foreign Application Priority Data

Oct. 17, 2019    (JP) .............................. JP2019-190387

(51) Int. Cl.
*H04N 5/232*    (2006.01)
*G02B 7/10*    (2021.01)
*G02B 7/28*    (2021.01)

(52) U.S. Cl.
CPC ......... *H04N 5/23296* (2013.01); *G02B 7/102* (2013.01); *H04N 5/23212* (2013.01); *G02B 7/282* (2013.01)

(58) Field of Classification Search
CPC ........... H04N 5/23296; H04N 5/23212; H04N 5/23209; G02B 7/102; G02B 7/282
See application file for complete search history.

(56) References Cited

U.S. PATENT DOCUMENTS

| 8,724,980 B2 | 5/2014 | Hongu | |
| 2005/0254042 A1* | 11/2005 | Geh | G03F 7/706 356/124 |
| 2013/0010373 A1* | 1/2013 | Abe | G02B 7/282 359/698 |
| 2016/0073005 A1* | 3/2016 | Sugita | G03B 17/14 348/349 |
| 2020/0175666 A1* | 6/2020 | Ohshima | G01B 11/02 |

FOREIGN PATENT DOCUMENTS

JP    2012073584 A    4/2012

* cited by examiner

*Primary Examiner* — Mekonnen D Dagnew
(74) *Attorney, Agent, or Firm* — Rossi, Kimms & McDowell LLP

(57) ABSTRACT

A lens control apparatus that controls moving of each of the first optical element and the second optical element during focusing includes a first controller that controls driving of the first optical element to move the first optical element to a first target position according to an object distance, a second controller that controls driving of the second optical element to move the second optical element to a second target position according to the object distance, and a correction value calculator that calculates a correction value for the second target position using a difference between an actual position of the first optical element and the first target position, and focus sensitivities of the first and second optical elements and calculates the correction value using a correction limit value smaller than a maximum movable amount of the second optical element from the second target position.

13 Claims, 11 Drawing Sheets

LENS CONTROL APPARATUS, OPTICAL APPARATUS, AND LENS CONTROL METHOD

BACKGROUND OF THE INVENTION

Field of the Invention

The present invention relates to a lens control apparatus configured to control moving of an optical element during focusing.

Description of the Related Art

Some optical apparatuses, such as an image pickup apparatus and an interchangeable lens, move a plurality of focus lenses during focusing. Japanese Patent Laid-Open No. ("JP") 2012-073584 discloses an optical apparatus that reduces a focus shift (image plane error) caused by a positional deviation of a first focus lens having a lower resolution by moving a second focus lens having a higher resolution.

However, a large moving amount of the second focus lens in the optical apparatus disclosed in JP 2012-073584 may generate large aberrations, such as a spherical aberration and a distortion, and degrade the in-focus accuracy and imaging quality.

SUMMARY OF THE INVENTION

The present invention provides a lens control apparatus and an optical apparatus having the same, each of which can reduce a focus shift while suppressing aberrations.

A lens control apparatus according to one aspect of the present invention configured to control moving of each of the first optical element and the second optical element during focusing includes at least one processor or circuit configured to execute a plurality of tasks including a first control task configured to control driving of the first optical element so as to move the first optical element to a first target position according to an object distance, a second control task configured to control driving of the second optical element so as to move the second optical element to a second target position according to the object distance, and a correction value calculation task configured to calculate a correction value used to correct the second target position using a positional difference between an actual position of the first optical element and the first target position, and focus sensitivities of the first and second optical elements. The correction value calculation task calculates the correction value by setting to an upper limit a correction limit value smaller than a maximum movable amount of the second optical element from the second target position.

An optical apparatus including the above lens control apparatus, and a lens control method corresponding to the above lens control apparatus also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
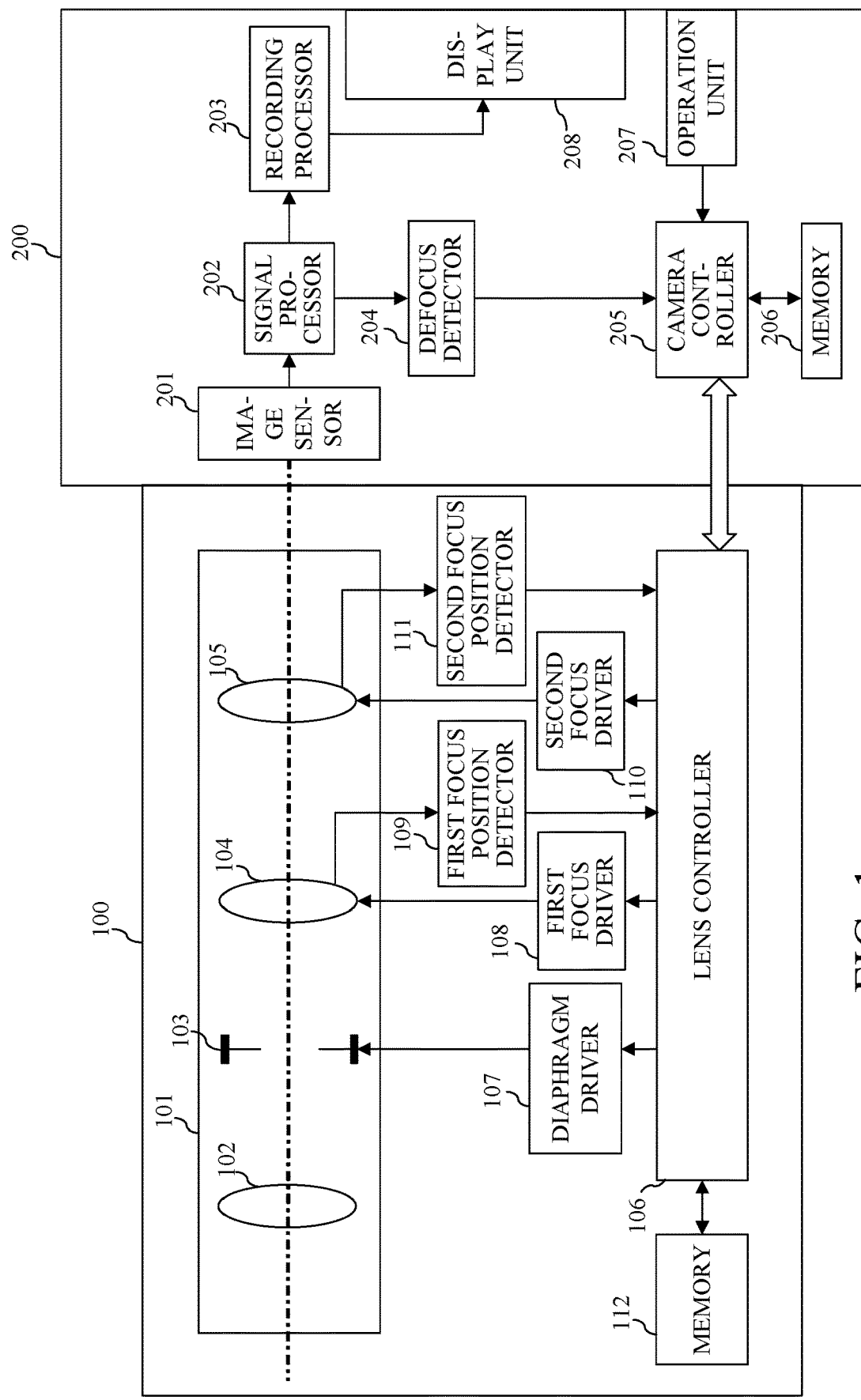
FIG. 1 illustrates a configuration of a lens interchangeable camera system according to a first embodiment of the present invention.

FIG. 1 illustrates a configuration of a lens interchangeable type camera system according to a first embodiment of the present invention. This camera system includes an image pickup apparatus (referred to as a camera body hereinafter) 200 and a lens apparatus (referred to as an interchangeable lens hereinafter) 100 as an optical apparatus that is attachable to and detachable from the camera body 200. The camera body 200 and the interchangeable lens 100 are mechanically and electrically connected via an unillustrated mount. The camera body 200 supplies the power to the interchangeable lens 100 via a power terminal provided to the mount, and communicates with the interchangeable lens 100 via a communication terminal provided to the mount.

The interchangeable lens 100 has an imaging optical system 101. The imaging optical system 101 images light from an unillustrated object to form an optical image (object image) on an image sensor 201 in the camera body 200. The interchangeable lens 100 includes a lens control apparatus described later.

The imaging optical system 101 according to this embodiment is a single focus lens. The imaging optical system 101 includes, in order from the object side, a field lens 102, a diaphragm (aperture stop) unit 103, a first focus lens (first optical element) 104, and a second focus lens (second optical element) 105.

The first focus lens 104 is movable in the optical axis direction of the imaging optical system 101 mainly for focusing of the object, and is driven by an actuator in a first focus driver (first driver) 108. The second focus lens 105 is movable in the optical axis direction so as to perform a focus correction that reduces a focus shift caused by moving the first focus lens 104 and an aberration correction that reduces an aberration caused by moving the first focus lens 104, and is driven by an actuator in a second focus driver (second driver) 110. The positions of the first focus lens 104 and the second focus lens 105 are detected by a first focus position detector 109 and a second focus position detector 111, respectively. Although the second focus lens 105 corrects the aberrations in this embodiment, the first focus lens 104 may correct the aberrations.

In the description according to this embodiment, both the first focus lens 104 and the second focus lens 105 are single focus lenses, but they may be a magnification varying lens that can change a focal length or an aberration varying lens that can change an aberrational state.

The field lens 102 adjusts a traveling direction of peripheral light. The diaphragm unit 103 adjusts a light amount by changing an aperture diameter by opening and closing unillustrated diaphragm blades by an actuator in a diaphragm driver 107.

A lens controller 106 includes a computer having a CPU, an internal memory, and the like. The lens controller 106 controls the diaphragm driver 107, the first focus driver 108, and the second focus driver 110. The memory (storage unit) 112 includes a ROM, a RAM, etc., and stores various data.

The data stored in the memory 112 includes data indicating a relationship between the object distance and the positions of the first focus lens 104 and the second focus lens 105 (first focus target position and second focus target position, which will be described later) which provide the in-focus state, data indicating a relationship between the object distance and the focus sensitivities (first focus sensitivity and second focus sensitivity) each indicating a ratio of a moving amount of an image plane to a unit distance of each of the first focus lens 104 and the second focus lens 105, and data indicating a relationship between the object distance and a correction limit value of the second focus lens 105 (which will be described later).

A lens control apparatus includes the lens controller 106, the first focus position detector 109, the second focus position detector 111, the first focus driver 108, the second focus driver 110, and the memory 112.

The camera body 200 includes an image sensor 201, a signal processor 202, a recording processor 203, a defocus detector 204, a camera controller 205, a memory 206, an operation unit 207, and a display unit 208. The image sensor 201 photoelectrically converts (images) an object image formed by the imaging optical system 101 to generate an electric signal (analog imaging signal), and outputs an electric signal to the signal processor 202. The image sensor 201 has focus detecting pixels for detecting the focus state of the imaging optical system 101 in addition to the imaging pixels for generating image data.

The signal processor 202 converts an analog imaging signal from the image sensor 201 into a digital imaging signal, and performs various image processing, such as a noise removal and a color correction, for the digital imaging signal to generate image data. The signal processor 202 outputs the image data to the recording processor 203 so as to record it in a recording medium, or outputs it to the display unit 208 so as to display it.

The defocus detector 204 detects a focus state (defocus amount) of the imaging optical system 101 using the signal from the focus detecting pixels. More specifically, the defocus detector 204 obtains a pair of image signals having a phase difference according to a defocus amount from the focus detecting pixels, and performs a correlation calculation for the pair of image signals so as to calculate the phase difference, and calculates the defocus amount from the phase difference. The defocus detector 204 outputs the detected defocus amount to the camera controller 205.

The camera controller 205 includes a computer having a CPU, an internal memory, and the like, and is electrically connected to the recording processor 203, the defocus detector 204, and the memory 206. The camera controller 205 reads and executes a computer program recorded in the memory 206, and communicates information necessary for the autofocus (AF) control with the lens controller 106.

The camera controller 205 controls the camera body 200 and the interchangeable lens 100 according to an input from the camera operation unit 207 including an unillustrated imaging switch and various setting switches. For example, the camera controller 205 causes the defocus detector 204 to detect the defocus amount in response to the half-pressing operation of the imaging switch, and calculates a focus driving amount for moving the first and second focus lenses 104 and 105 from those current positions acquired from the lens controller 106 to positions (focus positions) that provide the in-focus state according to the defocus amount. Then, a focus driving command including the focus driving amount is transmitted to the lens controller 106.

Figure 2:
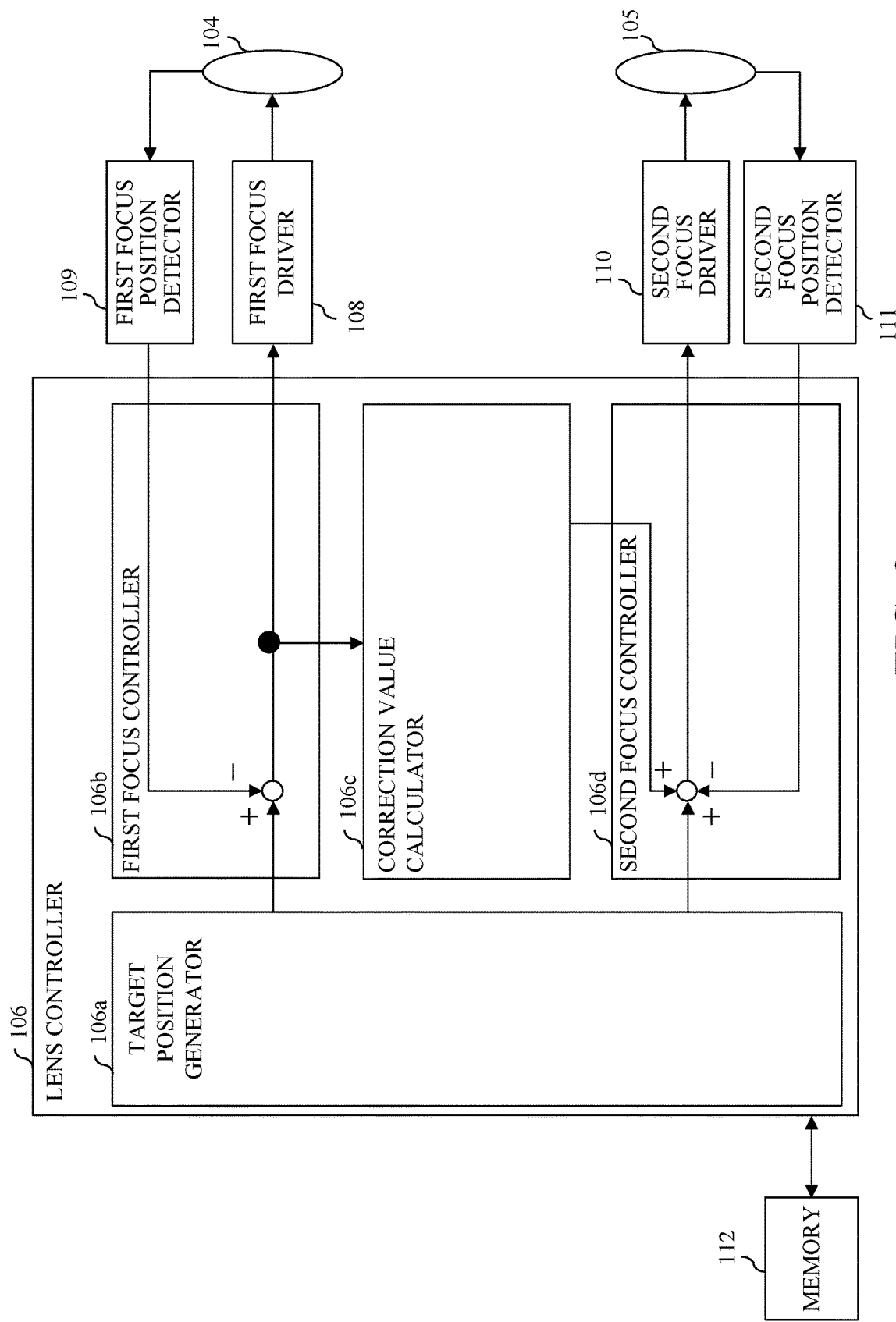
FIG. 2 illustrates a configuration of a lens controller according to the first embodiment.

FIG. 2 illustrates a configuration relating to driving controls of the first and second focus lenses 104 and 105 in the lens controller 106. The lens controller 106 includes a target position generator 106a, a first focus controller (first controller) 106b, a correction value calculator 106c, and a second focus controller (second controller) 106d.

The target position generator 106a generates a first focus target position (first target position) and a second focus target position (second target position) according to the focus driving amount included in the focus driving command output from the camera controller 205 to the lens controller 106. The first focus target position and the second focus target position are the in-focus positions of the first focus lens 104 and the second focus lens 105 for the same object distance, respectively.

The first focus controller 106b calculates a first focus position deviation which is a difference (positional difference) between the first focus target position acquired from the target position generator 106a and the actual position of the first focus lens 104 (referred to as a first focus actual position hereinafter) acquired from the first focus position detector 109, and outputs a first focus position deviation to the correction value calculator 106c. The first focus controller 106b calculates the first focus driving amount by multiplying the calculated first focus position deviation by a PID gain, and outputs it to the first focus driver 108.

The correction value calculator 106c calculates the correction value for the second focus lens 105 (referred to as a second focus correction value hereinafter) using the first focus position deviation calculated by the first focus controller 106b and the focus sensitivity of the first focus lens 104 stored in the memory 112 (referred to as a first focus sensitivity hereinafter) and the focus sensitivity of the second focus lens 105 (referred to as a second focus sensitivity hereinafter). The correction value calculator 106c limits the second focus correction value calculated according to the correction limit value stored in the memory 112, and outputs the limited, second focus correction value to the second focus controller 106d. A method of calculating the second focus correction value limited by the correction limit value will be described later.

The second focus controller 106d calculates a second focus correction target position by summing up the second focus correction value acquired from the correction value calculator 106c and the second focus position deviation that is a difference (positional difference) between the second focus target position acquired by the target position generator 106a and the actual position of the second focus lens 105 detected by the second focus position detector 111 (referred to as a second focus actual position hereinafter). The second focus controller 106d calculates the second focus driving amount by multiplying the moving amount from the second focus actual position to the second focus correction target position by the PID gain, and outputs it to the second focus driver 110.

The lens controller 106 repeats, at a predetermined control cycle, the calculation of the first focus driving amount by the first focus driver 108, the calculation of the second focus correction value by the correction value calculator 106c, and the calculation of the second focus driving amount by the second focus driver 110. The lens controller 106 performs focusing by the first focus lens 104 and the focus shift correction by the second focus lens 105 by causing the first focus driver 108 to drive the first focus lens 104 by the first focus driving amount and causes the second focus driver 110 to drive the second focus lens 105 by the second focus driving amount at the control cycle. A detailed description will be given of driving the second focus lens 105.

Figure 3A:
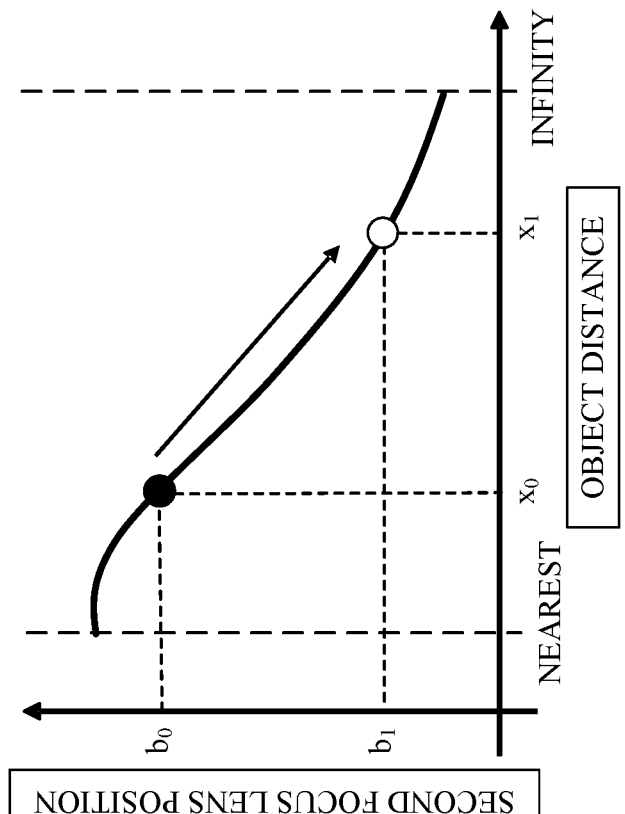
FIGS. 3A and 3B illustrate focus target positions for each object distance according to the first embodiment.
Figure 3B:
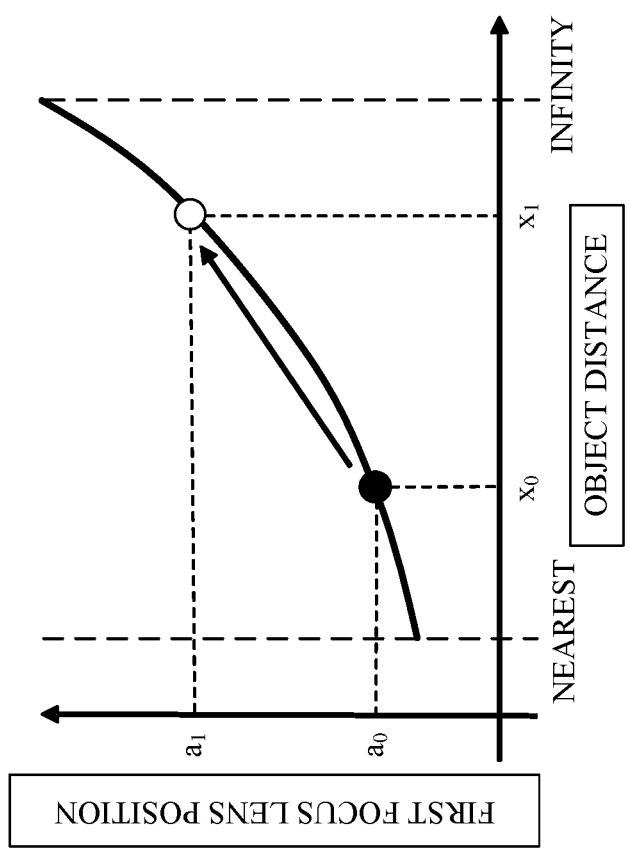

As described above, the lens controller 106 generates the first focus target position according to the focus driving amount transmitted from the camera controller 205, and generates the second focus target position that provides the focus state for the same object distance as the first focus target position. Referring now to FIGS. 3A and 3B, a description will be given of a method for generating the second focus target position.

FIG. 3A illustrates a relationship between the object distance and the first focus target position, and FIG. 3B illustrates a relationship between the object distance and the second focus target position. The abscissa axis represents the object distance, and the ordinate axis represents the positions of the first focus lens 104 and the second focus lens 105. Curves represent the first focus target position and the second focus target position for each object distance. When the first focus lens 104 is located at the position $a_0$ and the second focus lens 105 is located at the position $b_0$, the in-focus state can be obtained for the object distance $x_0$.

In FIG. 3A, when the object distance changes from $x_0$ to $x_1$ and the position of the first focus lens 104 moves from $a_0$ to $a_1$, the focus shift and aberration would occur unless the position of the second focus lens 105 was associatively moved to a position that provides the in-focus position for the object distance $x_1$. Accordingly, this embodiment calculates the object distance $x_1$ from the first focus target position $a_1$, and moves the second focus lens 105 from the position $b_0$ to the second focus target position $b_1$ that provides the in-focus state for the object distance $x_1$ as illustrated in FIG. 3B. Thereby, even if the object distance changes, the focus shift does not occur, and the aberration state can be maintained.

The memory 112 in the interchangeable lens 100 stores data of the first focus target positions and the second focus target positions for a plurality of representative object distances. The lens controller 106 calculates each focus target position for an object distance other than the representative object distances by the linear interpolation using the focus target positions corresponding to some representative object distances near the object distance.

Although the memory 112 stores the data indicating the relationship between the object distance and each focus target position in the description according to this embodiment, data indicating a relationship between the focal length or the aberration state and each focus target position may be stored.

Figure 4A:
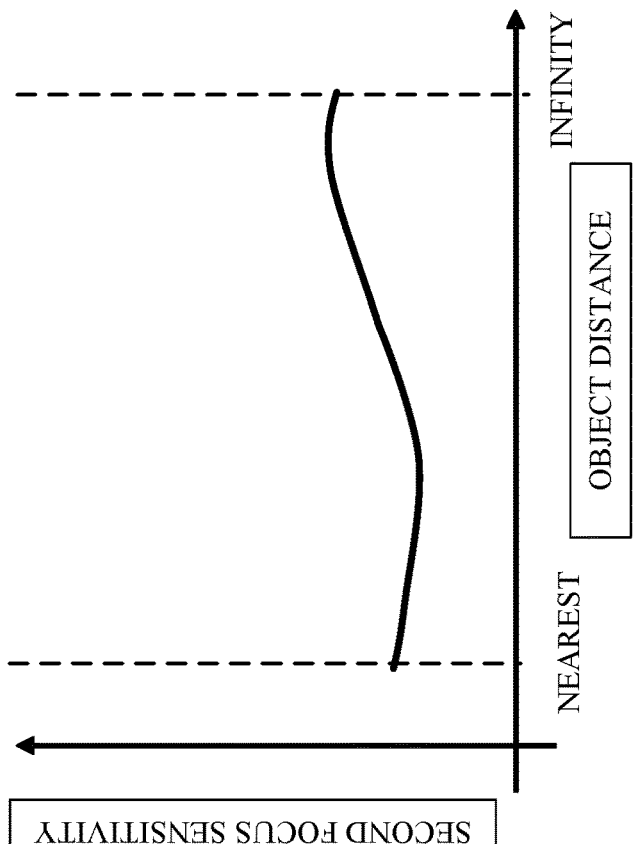
FIGS. 4A and 4B illustrate focus sensitivities according to object distances according to the first embodiment.
Figure 4B:
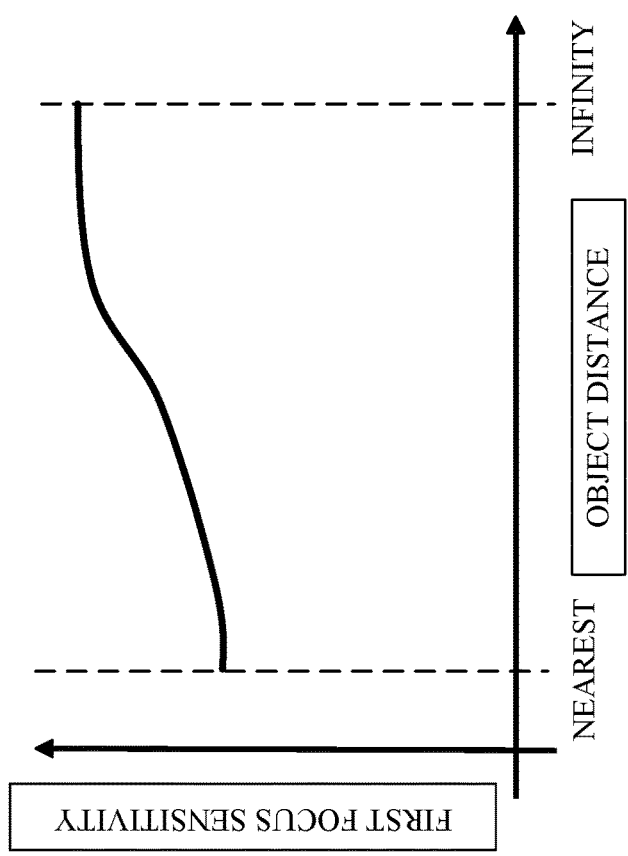

As described above, the lens controller 106 (correction value calculator 106c) calculates the second focus correction value according to the first focus sensitivity and the second focus sensitivity stored in the memory 112. Referring now to FIGS. 4A and 4B, a description will be given of the first focus sensitivity and the second focus sensitivity.

FIG. 4A illustrates a relationship between the object distance and the first focus sensitivity, and FIG. 4B illustrates a relationship between the object distance and the second focus sensitivity. The abscissa axis represents the object distance, and the ordinate axis represents the first focus sensitivity and the second focus sensitivity. Curves illustrate the first focus sensitivity and the second focus sensitivity at each object distance.

This embodiment moves the first focus lens 104 so as to roughly adjust the focus state of the object, and moves the second focus lens 105 so as to perform a correction as a fine adjustment of the focus state and an aberrational correction. Therefore, at each object distance, the first focus sensitivity illustrated in FIG. 4A has a value higher than that of the second focus sensitivity illustrated in FIG. 4B. That is, the moving amount of the image plane when the first focus lens 104 is moved by the unit moving amount is much larger than the moving amount of the image plane when the second focus lens 105 is moved by the unit moving amount.

The memory 112 in the interchangeable lens 100 stores the first focus sensitivities and the second focus sensitivities corresponding to a plurality of representative object distances. The lens controller 106 calculates each focus sensitivity for an object distance other than the representative object distances by a linear interpolation using focus sensitivities corresponding to some representative object distances near the object distance.

In this embodiment, the memory 112 stores data indicating a relationship between the object distance and the sensitivity, but may store data indicating a relationship between the focal length or the aberration state and the focus sensitivity.

Figure 5:
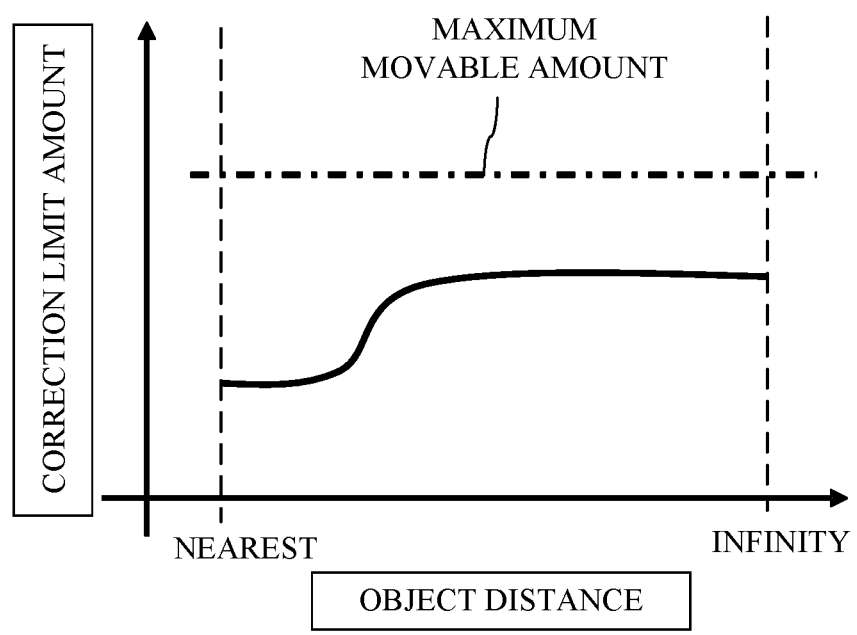
FIG. 5 illustrates a correction limit value for each object distance according to the first embodiment.

As described above, the lens controller 106 (correction value calculator 106c) limits the second focus correction value according to the correction limit value stored in the memory 112. Referring now to FIG. 5, a description will be given of the correction limit value.

FIG. 5 illustrates a relationship between the object distance and the correction limit value. The abscissa axis represents the object distance, and the ordinate axis represents the correction limit value. A curve illustrates the correction limit value for each object distance. The correction limit value is set as a value smaller than a maximum mechanically or controllable movable amount of the second focus lens 105 from the second focus target position (indicated by an alternate long and short dash line). More specifically, the correction limit value is set in a range in which the movement of the second focus lens 105 does not increase (generate) aberrations such as the spherical aberration and the distortion in the imaging optical system 101 due to the movement or so that the aberrational magnitude does not exceed a predetermined value. The correction limit value illustrated in FIG. 5 is set so as to change according to the object distance, and more specifically so as to be smaller on the nearest side than on the infinity side.

The memory 112 stores correction limit values for a plurality of representative object distances. The lens controller 106 calculates a correction limit value for an object distance other than the representative object distances by a linear interpolation using the correction limit values corresponding to some representative object distances near the object distance.

If there are a plurality of focus lenses for aberration corrections, data indicating a relationship between the object distance and the correction limit value may be stored in the memory 112 for each focus lens.

In this embodiment, the memory 112 stores data indicating a relationship between the object distance and the correction limit value, but data indicating a relationship between the focal length or aberration state and the correction limit value may be stored.

Figure 6A:
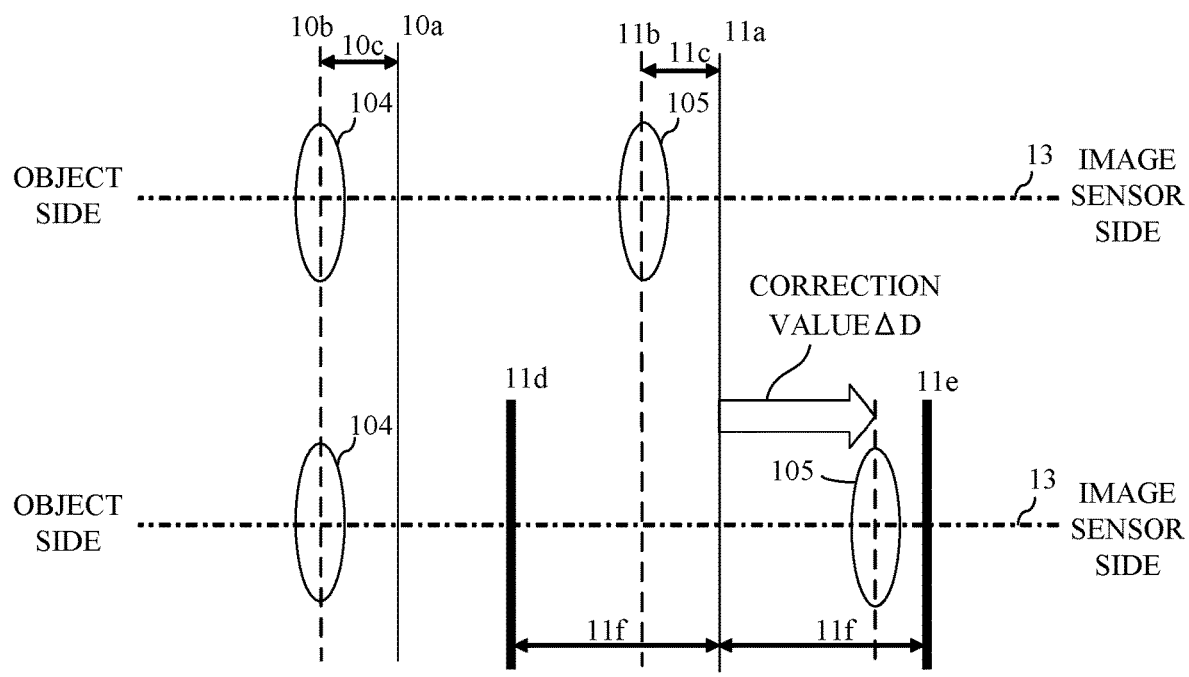
FIGS. 6A and 6B illustrate a method of calculating a second focus correction value according to the correction limit value according to the first embodiment.
Figure 6B:
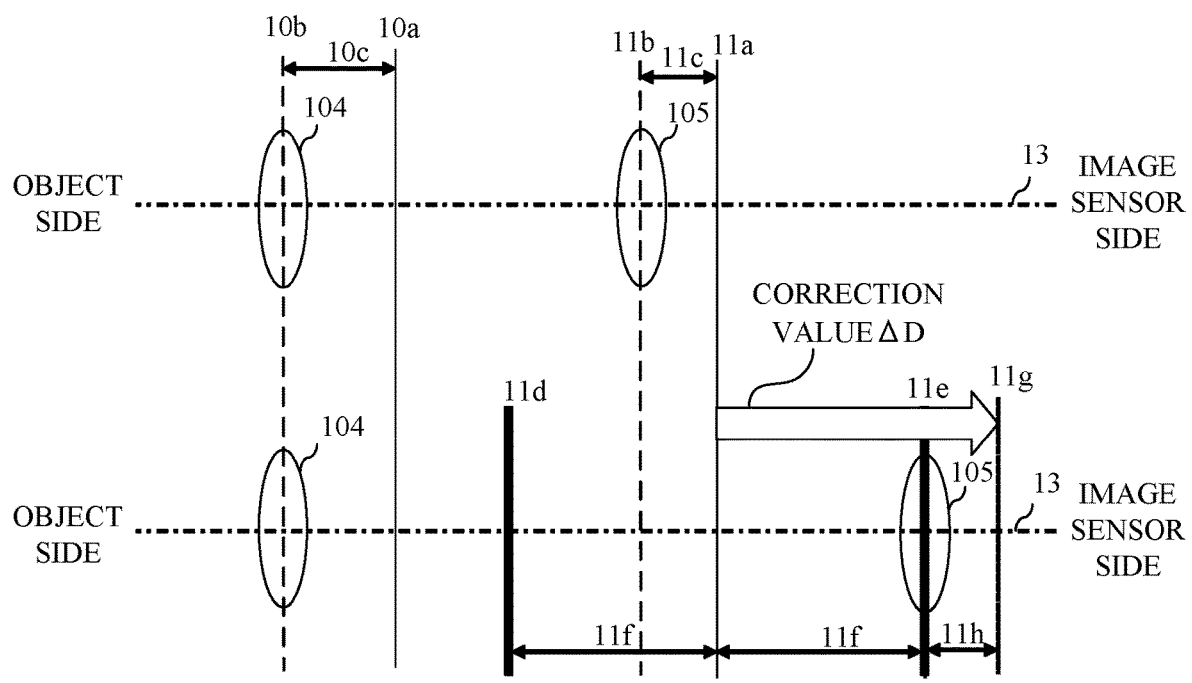

As described above, the lens controller 106 (correction value calculator 106c) calculates the second focus correction value according to the correction limit value. Referring now to FIGS. 6A and 6B, a description will be given of a method of calculating the second focus correction value according to the correction limit value.

FIGS. 6A and 6B illustrate a first focus target position 10a and a first focus actual position 10b, which are the positions on the optical axis 13, and a first focus position deviation 10c, which is a difference between them. These figures also illustrate a second focus target position 11a and a second focus actual position 11b, which are the positions on the optical axis 13, and a second focus position deviation 11c, which is a difference between them. The second focus target position 11a is a position that provides an in-focus state for the object distance corresponding to the first focus target position 10a as described above.

FIGS. 6A and 6B illustrate second focus correction limit positions 11d and 11e that shift from the second focus target position 11a by a second focus correction limit value 11f on the object side and the image sensor side, respectively. When the first and second focus lenses 104 and 105 move to the image sensor side, the in-focus state is obtained for an object on the near side, and when they move to the object side, the in-focus state is obtained for an object on the infinity side. In the following description, the moving direction to the object side is set to a positive direction and the moving direction to the image sensor side is set to a negative direction.

In FIG. 6A, the first focus lens 104 shifts from the first focus target position 10a to the infinity side by the first focus position deviation 10c, and similarly, the second focus lens 105 shifts from the second focus target position 11a to the infinity side by the second focus position deviation 11c.

At this time, a focus shift occurs since an object image is formed at a position that shifts from the image sensor 201 to the infinity side. Therefore, the lens controller 106 (correction value calculator 106c) acquires the first focus sensitivity and the second focus sensitivity from the memory 112, and calculates the second focus correction value ΔD by the following expression (1):

$$\Delta D = \Delta xa \times (\alpha/\beta) \quad (1)$$

In the expression (1), Δxa indicates the first focus position deviation 10c, α indicates the first focus sensitivity, and β indicates the second focus sensitivity. Note that α>β. Thus, the lens controller 106 divides a defocus amount (Δxa×α) caused by moving the first focus lens 104 by the second focus sensitivity β, and calculates the second focus correction value ΔD as a moving amount for canceling the defocus amount for moving the second focus lens 105. Then, the lens controller 106 moves the second focus lens 105 from the second focus actual position 11b by the moving amount that is a sum of the second focus position deviation 11c and the second focus correction value ΔD, or to the second focus correction target position 11g.

Thereby, the image plane that shifts to the infinity side relative to the image sensor 201 by moving the first focus lens 104 can be returned to the nearest side by moving the second focus lens 105, and thus the focus shift is corrected.

When the first focus position deviation 10c is a minute value and cannot be corrected only by moving the first focus lens 104 having the first focus sensitivity, the focus shift can be corrected by moving the second focus lens 105 having the second focus sensitivity smaller than the first focus sensitivity.

FIG. 6B illustrates the absolute value of the second focus correction value ΔD larger than the correction limit value 11f. As illustrated in this figure, when the second focus correction value ΔD indicates the correction to the image sensor side and its absolute value larger than the correction limit value 11f, the lens controller 106 changes the second focus correction value ΔD to the second focus correction limit value 11f having a negative value. On the contrary, when the second focus correction value ΔD indicates the correction to the object side and the absolute value larger than the correction limit value 11f, the lens controller 106 changes the second focus correction value ΔD to the second focus correction limit value 11f having a positive sign. In this way, the lens controller 106 limits the second focus correction value ΔD by setting the correction limit value 11f to the upper limit value.

In FIG. 6B, as a result of limiting the second focus correction value ΔD, there is a residue (referred to as a second focus correction residue hereinafter) 11h between the original target position of the second focus lens 105 (the position corresponding to the unlimited second focus correction value ΔD) 11g and the second focus correction limit position 11e. Thereby, a focus shift remains, which corresponds to the second focus correction residue 11h, but the focus shift can be reduced by moving the second focus lens 105 within a range that does not generate aberrations such as a spherical aberration and a distortion.

Figure 7B:
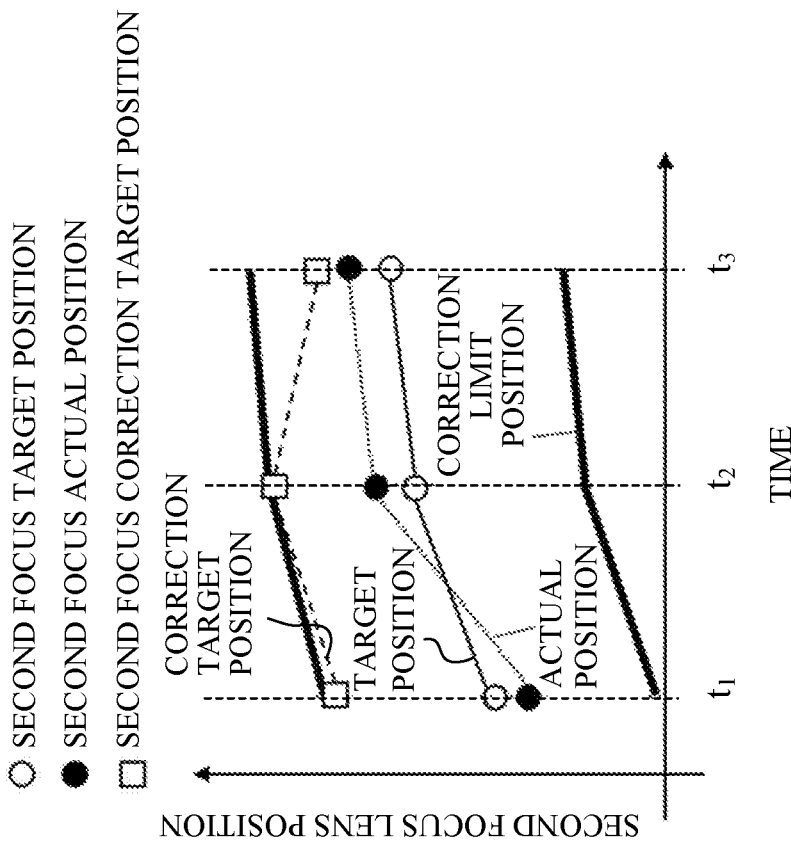
FIGS. 7A and 7B illustrate a method of performing corrective driving of the second focus lens at a predetermined control cycle according to the first embodiment.
Figure 7A:
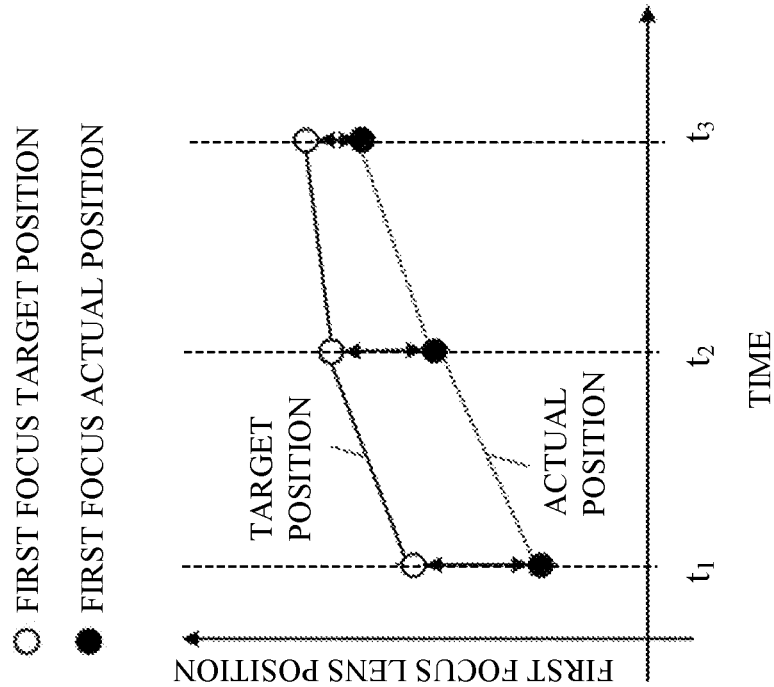

The lens controller 106 repeats, in a predetermined control cycle, driving of the first focus lens 104, calculating of the second focus correction value limited by the correction limit value, and driving of the second focus lens 105 (referred to as corrective driving hereinafter). FIGS. 7A and 7B show a method of performing corrective driving of the second focus lens 105 in a predetermined control cycle. FIG. 7A illustrates an example of calculating the second focus correction value in a predetermined control cycle, and illustrates the first focus target position (white dot) and the first focus actual position (black dot) at times $t_1$, $t_2$, and $t_3$. The ordinate axis represents the position of the first focus lens 104, and the abscissa axis represents time.

The lens controller 106 calculates the first focus position deviation using the first focus target position and the first focus actual position at each time. The lens controller 106 causes the first focus driver 108 to drive the first focus lens 104 toward the first focus target position according to the first focus position deviation.

The lens controller 106 calculates the second focus correction value using the first focus position deviation at each time and the first focus sensitivity and the second focus sensitivity acquired from the memory 112. More specifically, for example, the lens controller 106 calculates the second focus correction value $\Delta D_2$ at time $t_2$ by the following expression (2):

$$\Delta D_2 = \Delta x_1 \times \alpha_1/\beta_1 \quad (2)$$

In the expression (2), $\Delta x_1$ indicates the first focus position deviation at time $t_1$, $\alpha_1$ indicates the first focus sensitivity acquired from the memory 112 at time $t_1$, and $\beta 1$ indicates the second focus sensitivity acquired from the memory 112 at time $t_1$.

When the absolute value of the second focus correction value $\Delta D_2$ is larger than the correction limit value acquired from the memory 112 and the second focus correction value $\Delta D_2$ is a correction value on the object side, the lens controller 106 changes the second focus correction value $\Delta D_2$ to the second focus correction value $\Delta D_2'$ as a correction limit value having a positive sign.

FIG. 7B illustrates an example in which corrective driving of the second focus lens 105 is made in a predetermined control cycle. FIG. 7B illustrates the second focus target position (white dot), the second focus actual position (black dot), the second focus correction target position (white square), and the second focus correction limit position (black thick line) at times t1, t2, and t3. The ordinate axis represents the position of the second focus lens 105, and the abscissa axis represents time. The second focus correction target position is calculated by adding the second focus correction value to the second focus target position.

The lens controller 106 calculates the second focus position deviation $\Delta x_2'$, which is a difference between the second focus correction target position and the second focus actual position at time $t_2$, for example, using the following expression (3):

$$\Delta x_2' = \Delta x_2 + \Delta D_2' \quad (3)$$

In the expression (3), $\Delta x_2$ represents the second focus position deviation from the second focus target position at time $t_2$, and $\Delta D_2'$ represents the second focus correction value at time $t_2$.

The lens controller 106 causes the second focus driver 110 to drive the second focus lens 105 toward the second focus correction target position according to the second focus position deviation $\Delta x_2'$. This configuration can perform the corrective driving of the second focus lens 105 in a predetermined control cycle while limiting the moving range of the second focus lens 105 to a range that generates no aberrations, and thus can restrains the in-focus accuracy and the imaging quality from degrading.

Figure 8A:
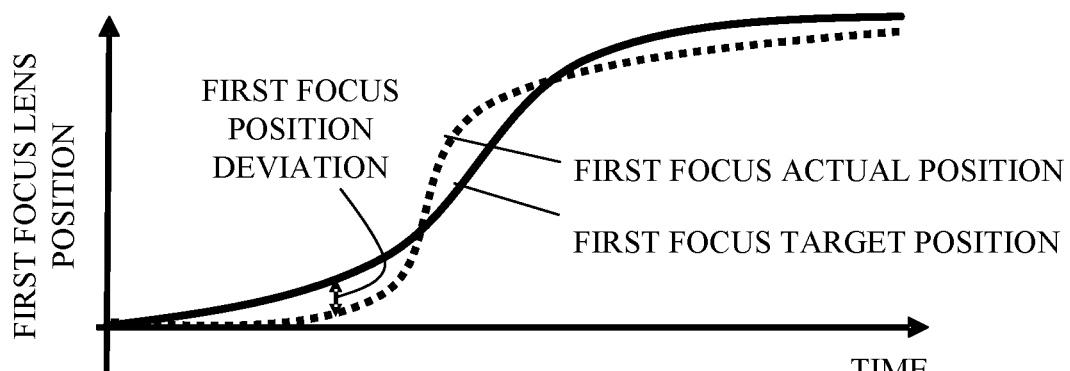
FIGS. 8A to 8C illustrate a specific example of the corrective driving of the second focus lens according to the first embodiment.
Figure 8B:
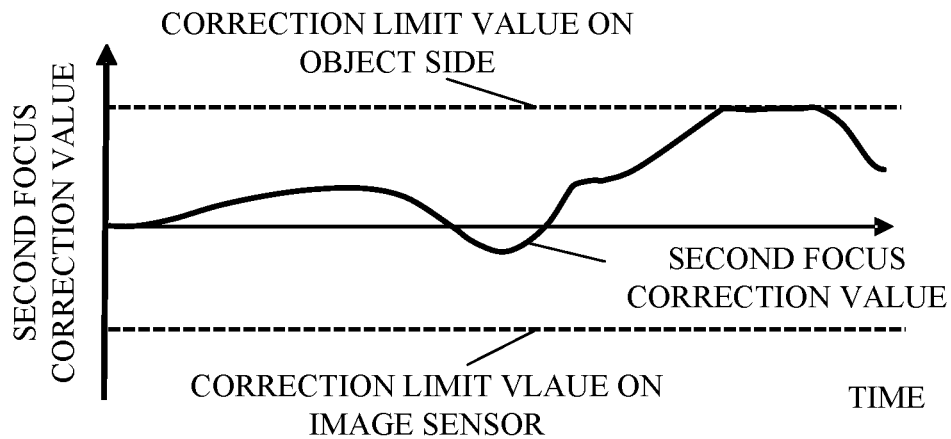
Figure 8C:
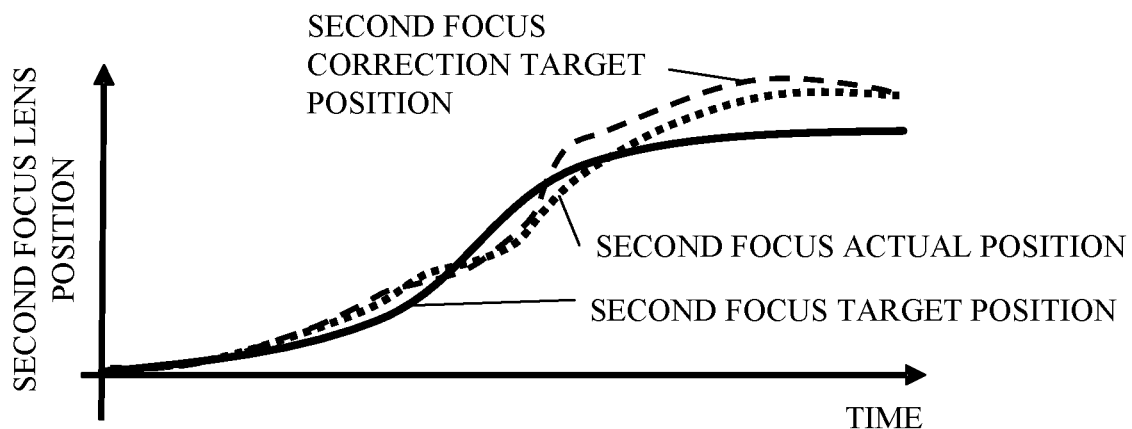

Referring now to FIGS. 8A to 8C, a description will be given of a specific example of corrective driving of the second focus lens 105. FIG. 8A illustrates the first focus target position, the first focus actual position, and a temporal change of the first focus position deviation that is a difference between them. The lens controller 106 (first focus controller 106b) calculates the first focus position deviation using the first focus actual position and the first focus target position, in a predetermined control cycle, and controls driving of the first focus lens 104 so that it follows the first focus target position in the control cycle.

FIG. 8B illustrates temporal changes of the second focus correction value and the correction limit value. The lens controller 106 (correction value calculator 106c) calculates the second focus correction value so that it falls within the correction limit value according to the first focus position deviation output from the first focus controller 106b for each control cycle and the first focus sensitivity and the second focus sensitivity acquired from the memory 112.

FIG. 8C illustrates the second focus target position, the second focus correction target position, the second focus actual position, and a temporal change of the second focus position deviation that is a difference between the second focus correction target position and the second focus actual position. The lens controller 106 (second focus controller 106d) calculates the second focus correction target position using the second focus correction value output from the correction value calculator 106c and the second focus position deviation, which is a difference between the second focus actual position and the second focus target position, in the control cycle, and controls driving of the second focus lens 104 so that the second focus lens 104 follows the second focus correction target position in the control cycle.

Figure 9:
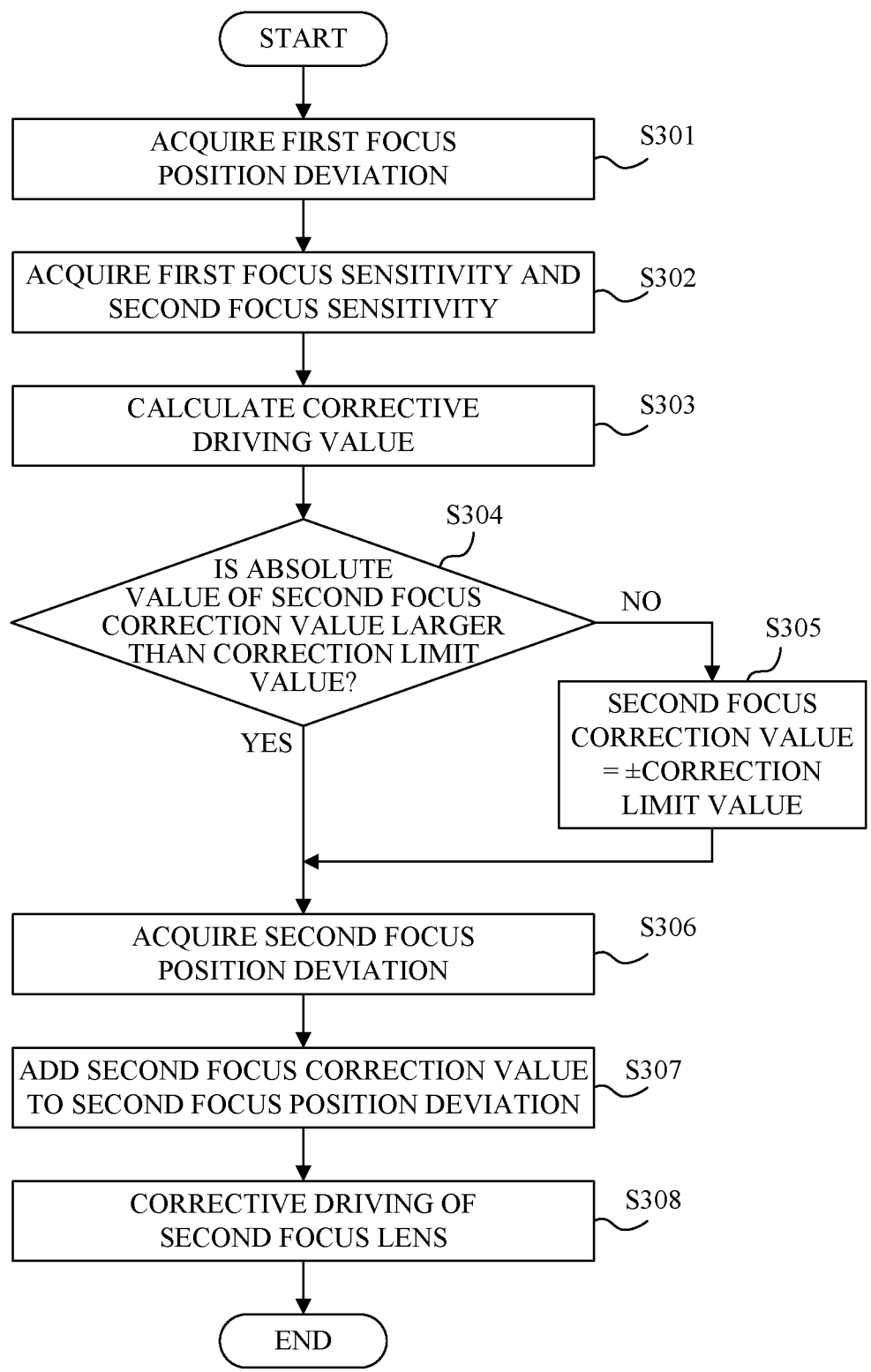
FIG. 9 is a flowchart showing processing of controlling the corrective driving of the second focus lens according to the first embodiment.

The flowchart in FIG. 9 illustrates control processing (control method) for the corrective driving of the second focus lens 105, which is executed by the lens controller 106 according to a computer program. In the step S301, the lens controller 106 calculates the first focus position deviation that is a difference between the first focus target position calculated by the target position generator 106b and the first focus actual position detected by the first focus position detector 109.

Next, in the step S302, the lens controller 106 acquires the first focus sensitivity and the second focus sensitivity according to the object distance from the memory 112.

Next, in the step S303, the lens controller 106 calculates a second focus correction value using the first focus position deviation and the ratio of the first focus sensitivity and the second focus sensitivity.

In the step S304, the lens controller 106 determines whether or not the second focus correction value calculated in the step S303 is larger than the correction limit value acquired from the memory 112. If it is larger, the flow proceeds to the step S305, and if it is not larger, the flow proceeds to the step S306.

In the step S305, the lens controller 106 changes the second focus correction value to the correction limit value. At this time, the lens controller 106 changes the second focus correction value to a correction limit value with a negative sign when the second focus correction value is a correction value to the image sensor side, and changes the second focus correction value to a correction limit value with a positive sign when the second focus correction value is a correction value to the object side. Then, the flow proceeds to the step S306.

In the step S306, the lens controller 106 calculates the second focus position deviation that is a difference between the second focus target position calculated by the target position generator 106b and the second focus actual position detected by the second focus position detector 111.

Next, in the step S307, the lens controller 106 calculates the second focus correction target position by adding the second focus correction value calculated in the step S303 or S305 to the second focus position deviation calculated in the step S306.

Next, in the step S308, the lens controller 106 multiplies the second focus correction target position calculated in step 307 by the PID gain to convert it into the second focus driving amount, and outputs the second focus driving amount to the second focus driver 110 to drive the second focus lens 105.

This embodiment can limit the second focus correction value and thereby suppress the aberrations such as the spherical aberration and the distortion caused by moving the second focus lens 105, as well as performing corrective driving of the second focus lens 105 for reducing the focus shift caused by moving the first focus lens 104.

In the above embodiment, if the second focus correction value was limited when the first focus position deviation and the ratio of the first and second focus sensitivities are considerably large, the corrective driving effect of the second focus lens 105 might be reduced. Therefore, thresholds are set for the first focus position deviation and the ratio of the first and second focus sensitivities, and when the value is lower than (or equal to or less than) the threshold, the second focus lens 105 may be correctively driven.

When a lens accessory such as an extender is mounted between the interchangeable lens 100 and the camera body 200, the second focus lens 105 may not be correctively driven. Whether or not to perform the corrective driving may be switched according to the imaging mode such as a release priority mode or a focus priority mode in the camera body 200.

The second focus lens 105 may be correctively driven only when the first focus lens 104 is located within a predetermined range from the first focus target position.

The correction limit value may be changed according to an image storage format such as JPEG or RAW. The correction limit value may be changed according to the driving state of the first focus lens 104. For example, while the first focus lens 104 is being driven, a large correction limit value may be set within a range that does not reduce the focus detection accuracy, and a smaller correction limit value may be set before and after the first focus lens 104 stops driving so as not to deteriorate the imaging quality.

In the description according to this embodiment, the second focus lens 105 is correctively driven, but an image sensor may be used for the second optical element and correctively driven.

In the description according to this embodiment, the lens control apparatus is provided in the interchangeable lens 100, but the lens control apparatus may be provided in the camera body 200, and driving of the first and second focus lenses 104 and 105 inside the interchangeable lens 100 may be controlled from the camera body 200 side. Furthermore, the lens control apparatus may be provided in a lens integrated type image pickup apparatus (optical apparatus) having a built-in imaging optical system.

Second Embodiment

Figure 10:
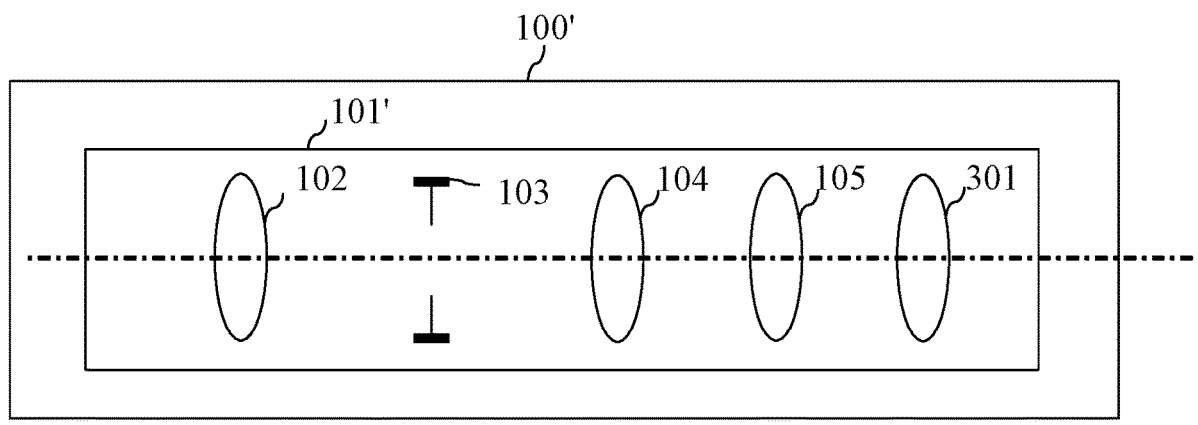
FIG. 10 illustrates a configuration of a lens control apparatus according to a second embodiment of the present invention.

FIG. 10 illustrates a configuration of an imaging optical system 101' in an interchangeable lens 100' according to a second embodiment of the present invention. Those elements in this embodiment, which are corresponding elements in the first embodiment, will be designated by the same reference numerals as those of the first embodiment, and a description thereof will be omitted.

The imaging optical system 101' includes, in order from the object side, a field lens 102, a diaphragm unit 103, a first focus lens 104, a second focus lens 105, and a third focus lens 301. As well as the second focus lens 105, the third focus lens 301 is moved in the optical axis direction so as to perform the focus correction and aberrational correction. The second focus lens 105 and the third focus lens 301 correspond to the second optical element.

The interchangeable lens 100' includes an unillustrated third focus driver that drives the third focus lens 301 and an unillustrated third focus position detector that detects the position of the third focus lens 301 in addition to the lens controller 106, the diaphragm driver 107, the first focus driver 108, the first focus position detector 109, the second focus driver 110, the second focus position detector 111, and the memory 112, which are illustrated in the first embodiment (FIG. 1).

Figure 11A:
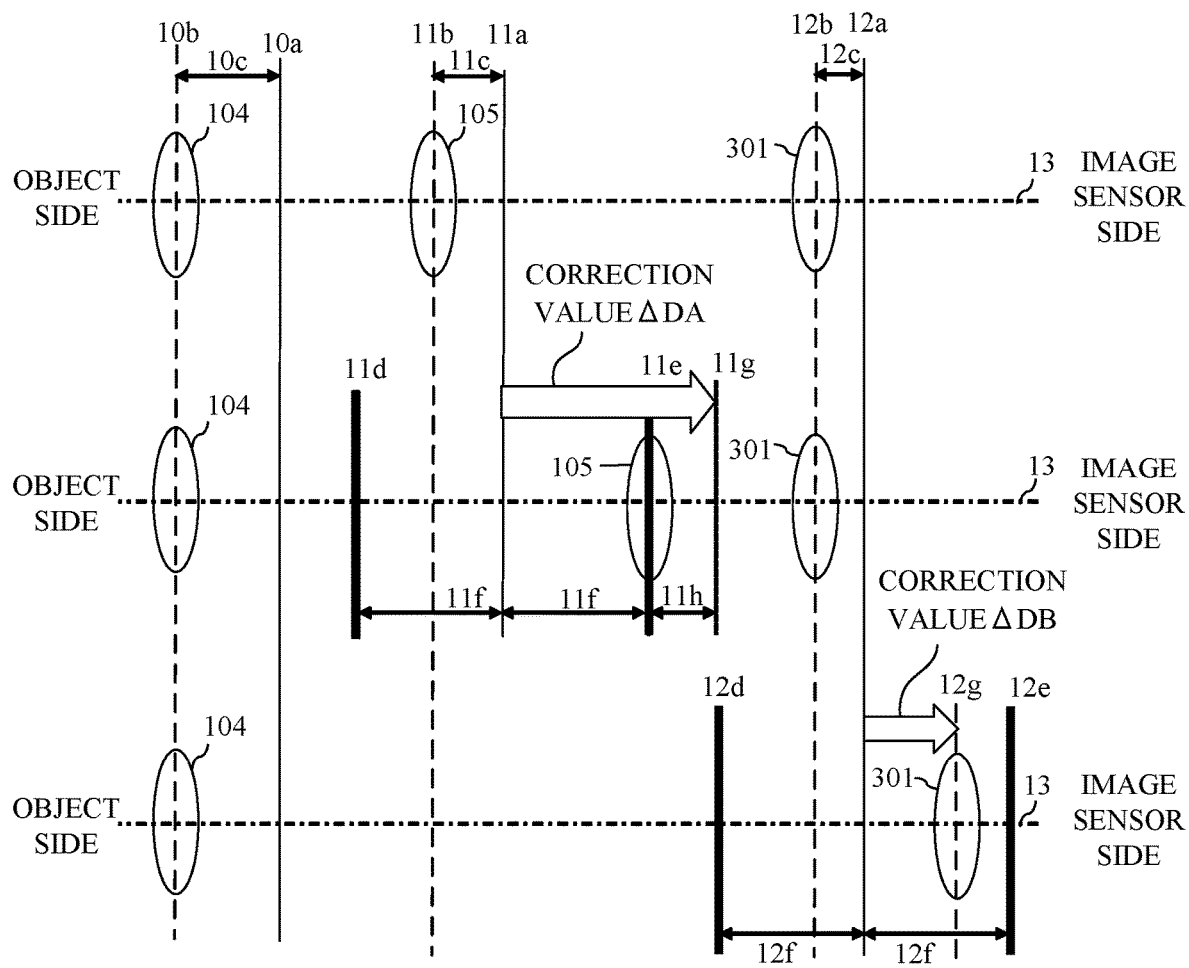
FIGS. 11A and 11B illustrate a method of calculating second and third focus correction values according to a correction limit value according to the second embodiment.
Figure 11B:
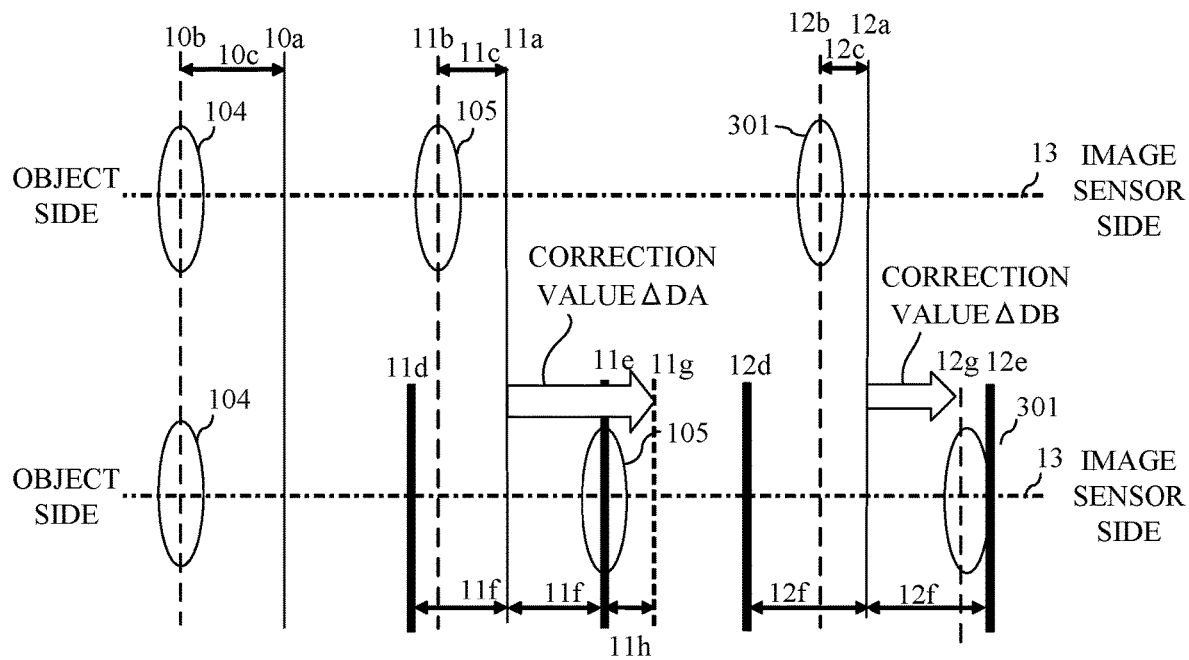

FIGS. 11A and 11B illustrate a method of this embodiment for calculating the second focus correction value ΔDA according to the correction limit value (referred to as a second focus correction limit value hereinafter) 11*f* for the second focus lens 105, and for calculating a correction value ΔDB of the third focus lens 301 (referred to as a third focus correction value hereinafter) according to a correction limit value (referred to as a third focus correction limit value hereinafter) 12*f* for the third focus lens 301.

In FIGS. 11A and 11B, the reference numerals (10*a*, 10*b*, 11*a* to 11*h*) relating to the first focus lens 104 and the second focus lens 105 indicate the same positions and values as those of the same reference numerals in FIGS. 6A and 6B. FIGS. 11A and 11B illustrate a third focus target position 12*a*, which is the target position of the third focus lens 301 stored in the memory 112, a third focus actual position 12*b* detected by the third focus position detector, and a third focus position deviation 12*c*, which is a difference between the third focus target position 12*a* and the third focus actual position 12*b*. FIGS. 11A and 11B illustrate third focus correction limit positions 12*d* and 12*e* that shift from the third focus target position 12*a* by a third focus correction limit value 12*f* on the object side and the image sensor side, respectively. When the third focus lens 301 is moved to the image sensor side (negative direction), the in-focus state is obtained for the object on the nearest side, and when it is moved to the object side (positive direction), the in-focus state is obtained for the object on the infinity side.

In FIG. 11A, the focus shift caused by moving the first focus lens 104 is first corrected by moving the second focus lens 105, and then the second focus correction residue as the focus shift that cannot be corrected by moving the second focus lens 105 is corrected by moving the third focus lens 301.

In this embodiment, the second focus sensitivity is lower than the first focus sensitivity, and the sensitivity of the third focus lens 301 (referred to as a third focus sensitivity hereinafter) is lower than the second focus sensitivity. Data indicating a relationship between the object distance and the third focus sensitivity is also stored in the memory 112.

In FIG. 11A, similar to FIG. 6A, the first focus lens 104 shifts from the first focus target position 10*a* to the infinity side by the first focus position deviation 10*c*, and similarly, the second focus lens 105 shifts from the second focus target position 11*a* to the infinity side by the second focus position deviation 11*c*. The lens controller 106 calculates the second focus correction value ΔDA by the following expression (4) similar to the expression (1):

$$\Delta DA = \Delta xa \times (\alpha/\beta) \quad (4)$$

In FIG. 11A, the image plane that shifts from the image sensor 201 to the infinity side by moving the first focus lens 104 is returned to the nearest side by the corrective driving of the second focus lens 105, so that the focus shift is reduced. However, the second focus correction residual 11*h* is generated between the second focus correction target position 11*g* and the second focus actual position 11*b* limited by the second focus correction limit position 11*e*, and the focus shift is not sufficiently reduced.

Accordingly, the lens controller 106 acquires the second focus sensitivity and the third focus sensitivity from the memory 112, and calculates the third focus correction value ΔDB by the following expression (5):

$$\Delta DB = \Delta xb \times (\beta/\gamma) \quad (5)$$

In the expression (5), Δ*xb* indicates the second focus correction residue 11*h*, β indicates the second focus sensitivity, and γ indicates the third focus sensitivity.

The lens controller 106 calculates the third focus correction target position 12*g* by adding the third focus correction value ΔDB to the third focus target position 12a. Then, the third focus lens 301 is moved by the moving amount of the sum of the third focus lens position deviation 12c and the third focus correction value ΔDB so that the third focus lens 301 is moved to the third focus correction target position 12g.

Thereby, the second focus correction residue 11h can be corrected by moving the third focus lens 301. That is, the image plane that shifts from the image sensor 201 to the infinity side due to the movement of the first focus lens 104 is returned to the nearest side by the corrective driving of the second focus lens 105 and the third focus lens 301 by the shift amount and thus the focus shift can be further reduced (properly corrected).

FIG. 11B illustrates the second focus lens 105 and the third focus lens 301 that are simultaneously moved. The lens controller 106 calculates the second focus correction value ΔDA and the third focus correction value ΔDB using the following expressions (6) and (7):

$$\Delta DA = [\Delta xa \times \alpha \times \{\beta/(\beta/\gamma)\}]/\beta \quad (6)$$

$$\Delta DB = [\Delta xb \times \alpha \times \{\gamma/(\beta/\gamma)\}]/\gamma \quad (7)$$

The lens controller 106 calculates the second focus correction value ΔDA using the defocus amount (Δxa×α) caused by moving the first focus lens 104, a ratio between the second focus sensitivity β and the third focus sensitivity γ, and the expression (6). Further, the lens controller 106 calculates the third focus correction value ΔDB using the defocus amount (Δxb×α) caused by moving the first focus lens 104, the ratio between the second focus sensitivity β and the third focus sensitivity γ, and the expression (7). Then, the lens controller 106 moves the second focus lens 105 from the second focus actual position 11b by a moving amount that is a sum of the second focus position deviation 11c and the second focus correction value ΔDA, and moves the third focus lens 301 from the third focus actual position 12b by a moving amount that is a sum of the third focus position deviation 12c and the third focus correction value ΔDB.

Thus, this embodiment distributes the moving amount for canceling the focus shift caused by the movement of the first focus lens 105 to the second focus lens 105 and the third focus lens 301, and properly corrects the focus shift.

When the focus correction residue exists even after the corrective driving of the third focus lens 105, the corrective driving of the second focus lens 104 may be further performed in order to reduce the focus correction residue.

Instead of the third focus lens 301 in this embodiment, an image sensor may be used for the second optical element and correctively driven.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

By limiting the moving amount (or the correction value) of the second focus lens for correcting the focus shift caused by the positional shift of the first optical element, the above embodiments can suppress the aberrations and reduce the focus shift.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-190387, filed on Oct. 17, 2019, which is hereby incorporated by reference herein in its entirety.

What is claimed is:

1. A lens control apparatus configured to control moving of each of the first optical element and the second optical element during focusing, the lens control apparatus comprising at least one processor or circuit configured to execute a plurality of tasks including:
   a first control task configured to control driving of the first optical element so as to move the first optical element to a first target position according to an object distance;
   a second control task configured to control driving of the second optical element so as to move the second optical element to a second target position according to the object distance; and
   a correction value calculation task configured to calculate a correction value used to correct the second target position using a positional difference between an actual position of the first optical element and the first target position, and focus sensitivities of the first and second optical elements,
   wherein the correction value calculation task calculates the correction value by setting to an upper limit a correction limit value smaller than a maximum movable amount of the second optical element from the second target position.

2. The lens control apparatus according to claim 1, wherein the second control task controls driving of the second optical element so as to move the second optical element to a position obtained by summing up a positional difference between an actual position of the second optical element and the second target position and the correction value.

3. The lens control apparatus according to claim 1, wherein the correction limit value changes according to the object distance.

4. The lens control apparatus according to claim 1, wherein the correction limit value limits the correction value so that an aberration of an optical system including the first and second optical elements does not increase due to a movement of the second optical element or a magnitude of the aberration does not exceed a predetermined value.

5. The lens control apparatus according to claim 1, wherein the focus sensitivity of the first optical element is higher than that of the second optical element.

6. The lens control apparatus according to claim 1, wherein there are a plurality of second optical elements, and
wherein the correction value calculation task calculates correction values in descending order of the focus sensitivity for the plurality of second optical elements.

7. The lens control apparatus according to claim 1, wherein the second control task controls driving of the second optical element so as to move the second optical element to the second target position corrected by the correction value, when the position difference of the first optical element or a ratio of focus sensitivities of the first and second optical elements is smaller than a threshold.

8. The lens control apparatus according to claim 1, wherein when the first optical element approaches to a position within a predetermined range relative to the first target position, the correction value calculation task controls driving of the second optical element so as to move the second optical element to the second target position corrected by the correction value.

9. The lens control apparatus according to claim 1, wherein the correction value calculation task changes the correction limit value according to a driving state of the first optical element.

10. The lens control apparatus according to claim 1, wherein the correction value calculation task changes the correction limit value according to an imaging mode in an image pickup apparatus that captures an image through an optical system including the first and second optical elements.

11. An optical apparatus comprising a lens control apparatus that controls moving of each of the first optical element and the second optical element during focusing,
wherein the lens control apparatus includes:
at least one processor or circuit configured to execute a plurality of tasks including:

a first control task configured to control driving of the first optical element so as to move the first optical element to a first target position according to an object distance;
a second control task configured to control driving of the second optical element so as to move the second optical element to a second target position according to the object distance; and
a correction value calculation task configured to calculate a correction value used to correct the second target position using a positional difference between an actual position of the first optical element and the first target position, and focus sensitivities of the first and second optical elements,
wherein the correction value calculation task calculates the correction value by setting to an upper limit a correction limit value smaller than a maximum movable amount of the second optical element from the second target position.

12. A method for controlling moving of each of the first optical element and the second optical element in focusing, the method comprising the steps of:
controlling driving of the first optical element so as to move the first optical element to a first target position according to an object distance;
controlling driving of the second optical element so as to move the second optical element to a second target position according to the object distance; and
calculating a correction value used to correct the second target position using a positional difference between an actual position of the first optical element and the first target position, and focus sensitivities of the first and second optical elements,
wherein the calculating step calculates the correction value by setting to an upper limit a correction limit value smaller than a maximum movable amount of the second optical element from the second target position.

13. A non-transitory computer-readable storage medium storing a computer program that causes a computer for controlling moving of each of the first optical element and the second optical element in focusing to execute the method according to claim 12.

* * * * *